(12) United States Patent
Binek et al.

(10) Patent No.: US 11,577,460 B2
(45) Date of Patent: Feb. 14, 2023

(54) ADDITIVE MANUFACTURING SPATTER SHIELDING

(71) Applicant: Hamilton Sundstrand Corporation, Charlotte, NC (US)

(72) Inventors: Lawrence Binek, Glastonbury, CT (US); David W. Morganson, Marlborough, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 352 days.

(21) Appl. No.: 16/745,812

(22) Filed: Jan. 17, 2020

(65) Prior Publication Data

US 2021/0221065 A1    Jul. 22, 2021

(51) Int. Cl.
| | | |
|---|---|---|
| *B29C 64/364* | (2017.01) | |
| *B33Y 30/00* | (2015.01) | |
| *B33Y 40/00* | (2020.01) | |
| *B33Y 50/02* | (2015.01) | |
| *B29C 64/393* | (2017.01) | |

(52) U.S. Cl.
CPC .......... *B29C 64/364* (2017.08); *B29C 64/393* (2017.08); *B33Y 30/00* (2014.12); *B33Y 40/00* (2014.12); *B33Y 50/02* (2014.12)

(58) Field of Classification Search
CPC ..... B29C 64/364; B29C 64/393; B33Y 30/00; B33Y 40/00; B33Y 50/02
See application file for complete search history.

(56) References Cited

U.S. PATENT DOCUMENTS

| | | | |
|---|---|---|---|
| 10,449,632 B2 | 10/2019 | Khairallah | |
| 2012/0251829 A1* | 10/2012 | Xu | B29C 64/135 |
| | | | 264/496 |
| 2019/0210151 A1 | 7/2019 | Deal et al. | |
| 2019/0232427 A1 | 8/2019 | Roychowdhury et al. | |
| 2019/0232428 A1 | 8/2019 | Roychowdhury et al. | |

FOREIGN PATENT DOCUMENTS

| | | |
|---|---|---|
| DE | 102011106380 A1 | 12/2012 |
| DE | 102011109411 A1 | 2/2013 |
| EP | 2857176 A1 | 4/2015 |
| WO | 0203322 A1 | 1/2002 |

OTHER PUBLICATIONS

Frank Herzog; Device useful for producing three-dimensional objects, comprises a carrying device for carrying the object, a coating device for applying layers of building material on the carrying device, and an irradiation source for irradiating layer; Dec. 13, 2012. (Year: 2012).*
Extended European search report issued in corresponding EP application No. 21152077.0, dated Jun. 7, 2021.

* cited by examiner

*Primary Examiner* — Joseph S Del Sole
*Assistant Examiner* — John Robitaille
(74) *Attorney, Agent, or Firm* — Locke Lord LLP; Daniel J. Fiorello; Gabrielle L. Gelozin

(57) ABSTRACT

A spatter protection system for an additive manufacturing machine can include a sheet configured to be disposed over a build area of the additive manufacturing machine. The sheet can include an aperture configured to allow a spatter from the build area to eject through the aperture during energy application and to land on a back side of the sheet to prevent the spatter from landing on the build area. The system can include a motive system supporting the sheet and configured to move the sheet to locate the aperture over an energy application area.

18 Claims, 3 Drawing Sheets

ADDITIVE MANUFACTURING SPATTER SHIELDING

FIELD

This disclosure relates to additive manufacturing, more specifically to spatter shielding (e.g., in laser powder bed fusion).

BACKGROUND

Spatter is generated during the laser powder bed fusion (LPBF) process. Material is ejected from the surface of the build layer and is re deposited as a function of applied energy and gas flow. Spatter results in oxide formation, non-uniform layer thickness, incomplete melting and increase in surface roughness. Spatter-generated defects result in degraded build properties and are a limiting factor is LPBF build chamber size. A part-dense build plate will be most susceptible to defects due to spatter material being included in the build layer. Some previous solutions include gas manifold modifications, part placement, and scan strategy to avoid spatter into build areas.

Such conventional methods and systems have generally been considered satisfactory for their intended purpose. However, there is still a need in the art for improved additive manufacturing spatter shielding. The present disclosure provides a solution for this need.

SUMMARY

A spatter protection system for an additive manufacturing machine can include a sheet configured to be disposed over a build area of the additive manufacturing machine. The sheet can include an aperture configured to allow a spatter from the build area to eject through the aperture during energy application and to land on a back side of the sheet to prevent the spatter from landing on the build area. The system can include a motive system supporting the sheet and configured to move the sheet to locate the aperture over an energy application area.

The motive system can be configured to track an energy application spot such that an energy beam passes through the aperture without contacting the sheet. The motive system can include a first roller and a second roller. The sheet can be rolled around each roller at an end thereof. The first roller and second roller can be configured to allow the aperture to be moved in a first axis.

In certain embodiments, at least the first roller can include a motor configured to wind or unwind the sheet therefrom. For example, the second roller can be a slave configured to wind or unwind in response the first roller unwinding or winding, respectively.

The motive system can include a rod for each roller. Each roller can be connected to a respective rod to be linearly actuated along the rod to move the aperture in a second axis perpendicular to the first axis. The system can further include one or more actuators connected to at least one rod. The one or more actuators are configured to move each rod to linearly actuate a respective roller in the second axis.

The system can include a controller configured to control at least the first roller and the one or more actuators to locate the aperture over an energy application spot to allow spatter to eject through the aperture. The controller can include any suitable hardware (e.g, processors, memory, etc.) and/or software module(s) configured to perform the disclosed function, for example.

In certain embodiments, the aperture can be elliptical. For example, in certain embodiments, the aperture can be circular. Any other shape is contemplated herein (e.g., non-circular elliptical.

The sheet can be a fabric, a polymer, or a sheet metal. For example, the sheet can be Mylar, Teflon, stainless steel, aluminum, or tape (e.g., sticky side up). Any other suitable material is contemplated herein.

In certain embodiments, the sheet can include one or more additional apertures. Any suitable number of apertures (e.g., one or more) is contemplated herein.

In accordance with at least one aspect of this disclosure, an additive manufacturing system can include an energy applicator configured to apply energy to a build area, a build area, and a spatter protection system for an additive manufacturing machine as disclosed herein, e.g., as described above. The system can include a housing configured to enclose the build area to provide an isolated atmosphere. The spatter protection system can be disposed within the housing to be contained within an isolated atmosphere.

In accordance with at least one aspect of this disclosure, a method can include locating an aperture in a sheet over an energy application spot during an additive manufacturing process to allow spatter to eject through the aperture and land on a back side of the sheet. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
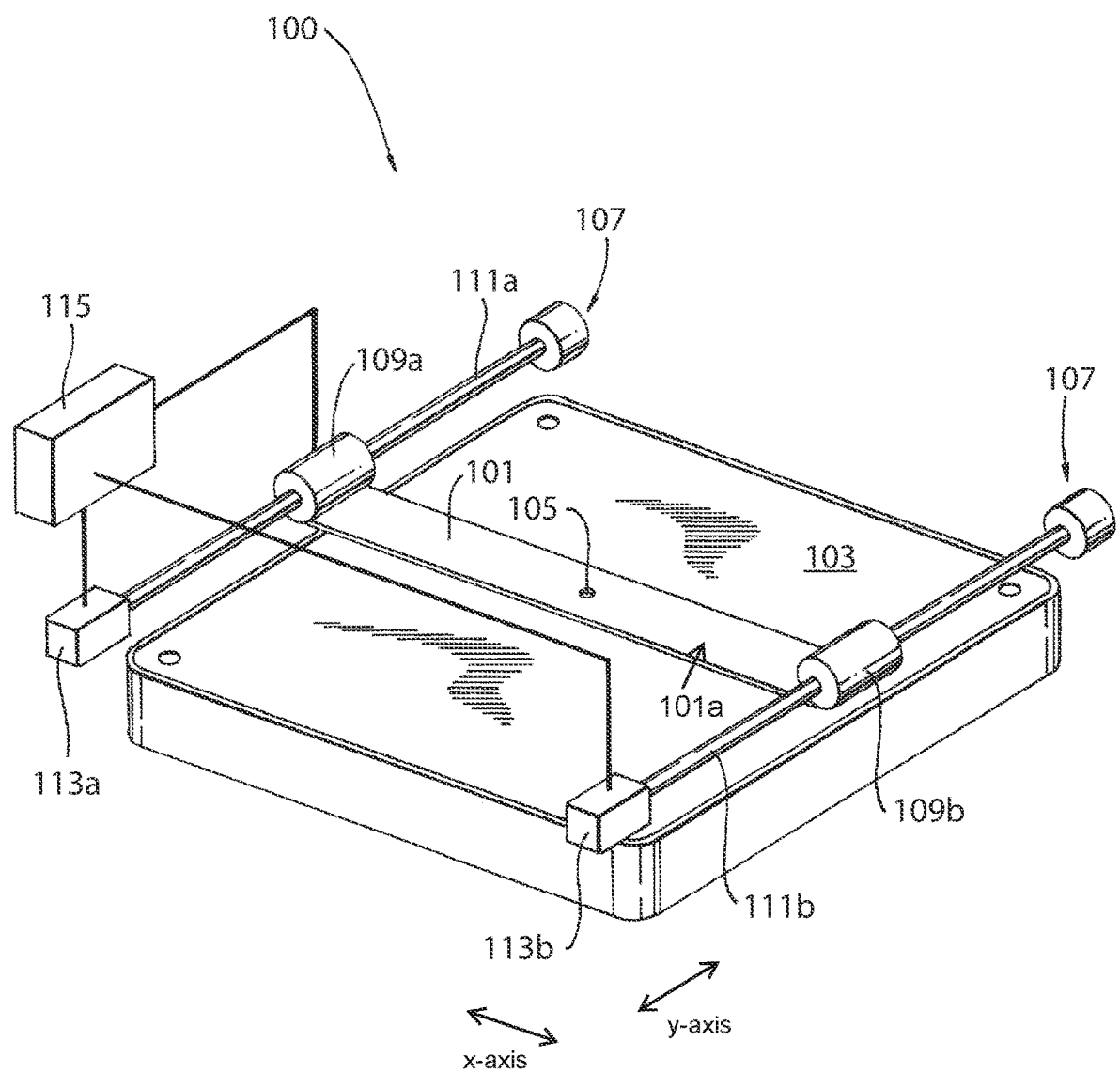
FIG. 1 is a perspective view of an embodiment of a system in accordance with this disclosure.
Figure 3:
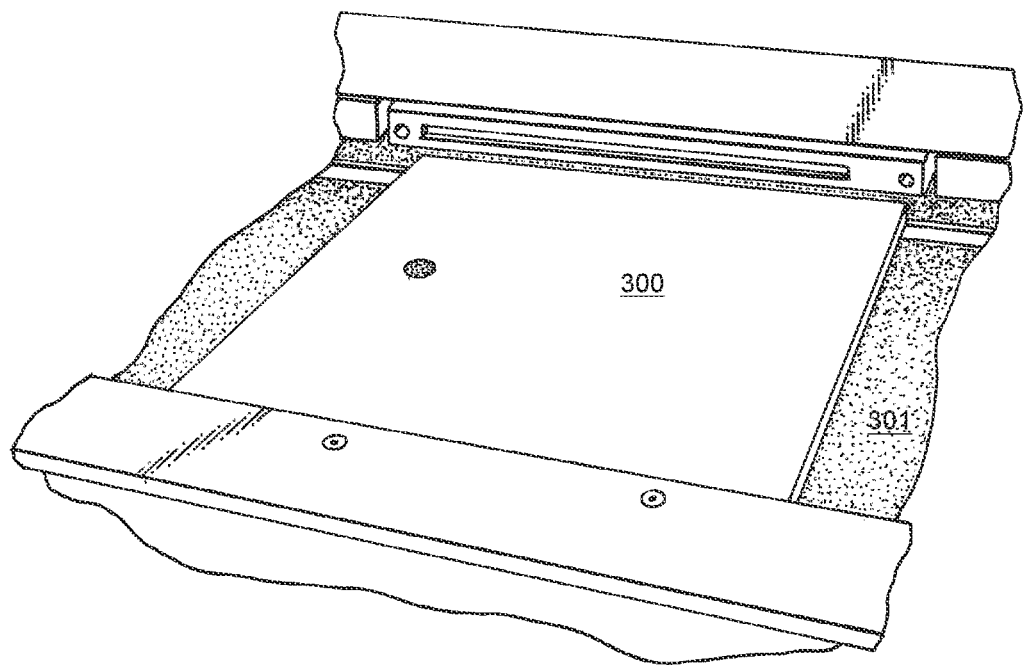
FIG. 3 is a perspective view of an embodiment of a sheet with an aperture disposed on a build area of an additive manufacturing machine.
Figure 4:
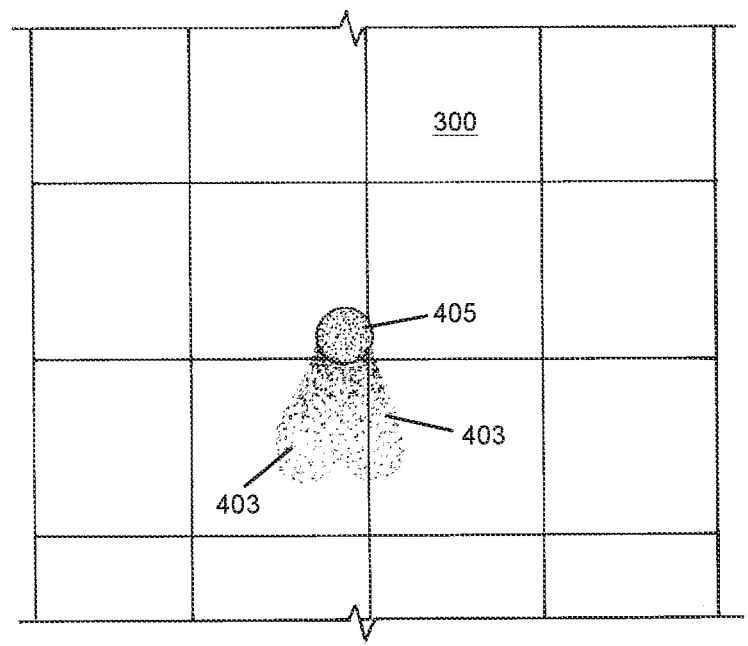
FIG. 4 is a plan view of the sheet of FIG. 3, showing captured spatter disposed on a back side of the sheet after use of a laser through the aperture with gas flow (in a direction from top to bottom of the image).

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-4.

Figure 2:
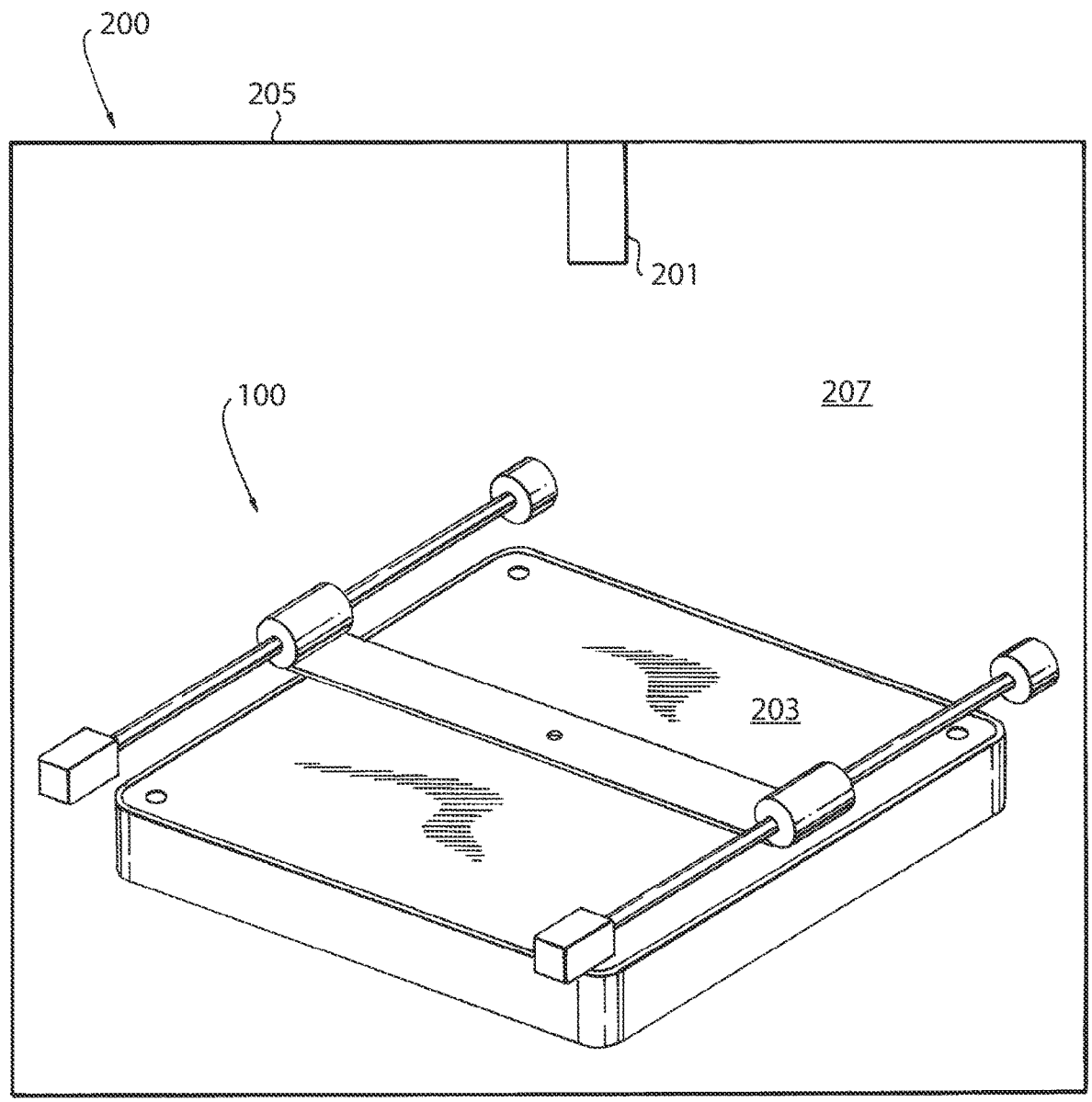
FIG. 2 is a perspective view of an embodiment of an additive manufacturing system in accordance with this disclosure.

Referring to FIG. 1, a spatter protection system 100 for an additive manufacturing machine (e.g., as shown in FIG. 2) can include a sheet 101 configured to be disposed over a build area 103 (e.g., a build plate) of the additive manufacturing machine. The sheet 101 can include an aperture 105 configured to allow a spatter (e.g., ejectant 403 of FIG. 4) from the build area 103 to eject through the aperture 105 during energy application (e.g., from a laser) and to land on a back side 101*a* (top side as shown) of the sheet 101 to prevent the spatter from landing on the build area 103. The system 100 can also include a motive system 107 supporting the sheet 101 and configured to move the sheet 101 to locate the aperture 105 over an energy application area (e.g., the spot where the laser contacts the power on the build plate).

The motive system 107 can be configured to track an energy application spot such that an energy beam passes through the aperture 105 without contacting the sheet 101. The motive system 107 can include a first roller 109*a* and a second roller 109*b*. The sheet 101 can be rolled around each roller 109*a*, 109*b* at an end thereof, e.g., as shown. The first roller 109*a* and second roller 109*b* can be configured to allow the aperture to be moved in a first axis (e.g., the x-axis as shown in FIG. 1).

In certain embodiments, at least the first roller 109*a* can include a motor (e.g., an electric motor) configured to wind or unwind the sheet therefrom 101. For example, the second roller 109*b* can be a slave configured to wind or unwind in response the first roller 109*a* unwinding or winding, respectively. In certain embodiments, both the first roller 109*a* and the second roller 109*b* can include a motor.

The motive system 107 can include a rod 111*a*, 111*b* for each roller 109*a*, 109*b*. Each roller 109*a*, 109*b* can be connected to a respective rod 111*a*, 111*b* to be linearly actuated along the rod 111*a*, 111*b* to move the aperture 105 in a second axis (e.g., the y-axis) perpendicular to the first axis. The motive system 107 can further include one or more actuators 113*a*, 113*b* connected to at least one rod 111*a*, 111*b* (e.g., both as shown). The one or more actuators 113*a*, 113*b* can be configured to move each rod 111*a*, 111*b* to linearly actuate a respective roller 109*a*, 109*b* in the second axis. For example, the one or more actuators 113*a*, 113*b* can be one or more rotational actuator and a respective rod can be a screw configured to rotate and to advance the respective roller along the thread thereof. The rollers 109*a*, 109*b* can be mounted on a linear bearing such that the screw can advance the rollers 109*a*, 109*b* without causing the rollers 109*a*, 109*b* to rotate around the screw.

The motors can be or include a spring tension return type and/or any other suitable type. Any other suitable system to linearly actuate one or more of the rollers 109*a*, 109*b* is contemplated herein.

The system 100 and/or the motive system 107 can include a controller 115 configured to control at least the first roller 109*a*, 109*b* and the one or more actuators 113*a*, 113*b* to locate the aperture 105 over an energy application spot to allow spatter to eject through the aperture 105. The controller 115 can include any suitable hardware (e.g., processors, memory, etc.) and/or software module(s) configured to perform the disclosed function, for example. Any other suitable system configured to move and control a position of the aperture 105 is contemplated herein. In certain embodiments, the sheet 101 can include track holes in sheet (e.g., as in camera film) to control the linear amount of sheet 101 dispensed as a function of turn of the motors. Embodiments can utilize a bulk roll of sheet material, and can also utilize logic (e.g., in controller 115 to account for changes in linear dispensing rate (which can change as it relates to turns as the roll changes in diameter). Embodiments can include a visual sensor and/or an eyelet for monitoring and/or recalibrating the aperture position as roller unwinds. The controller 115 can include any suitable logic and/or feedback to determine an amount of sheet dispensed by the rollers 109*a*, 109*b*, and to control the position of the aperture 105.

In certain embodiments, the aperture 105 can be elliptical. For example, in certain embodiments, the aperture 105 can be circular. In certain embodiments, the aperture 105 can be rectangular (e.g., tall in the y-axis when flow is in x-axis to have a longer perpendicular to direction of laminar flow, for example). The shape can be selected to capture all or most of the spatter under a predetermined sweep gas flow condition. Any other shape is contemplated herein (e.g., non-circular elliptical).

The sheet 101 can be a fabric, a polymer, or a sheet metal. For example, the sheet 101 can be Mylar, Teflon, stainless steel, aluminum, or tape (e.g., sticky side up). Any other suitable material is contemplated herein.

Embodiments can utilize a one-time use material, or can be reusable. Embodiments can include a non-rolled sheet with linear actuators instead of rollers, but such embodiments may require a larger space due to the shifting position of the planar non-rolled sheet.

Embodiments of a sheet 101 can be about five thousands of an inch thick, and can be placed about 2 mm to about 3 mm above build surface. Any other suitable thickness and placement is contemplated herein.

In certain embodiments, the sheet 101 can include one or more additional apertures 105. Any suitable number of apertures (e.g., one or more) is contemplated herein.

In accordance with at least one aspect of this disclosure, referring to FIG. 2, an additive manufacturing system 200 can include an energy applicator 201 configured to apply energy to a build area 203, a build area 203, and a spatter protection system 100 as disclosed herein, e.g., as described above. The system 200 can include a housing 205 configured to enclose the build area 203 to provide an isolated atmosphere 207. The spatter protection system 100 can be disposed within the housing 205 to be contained within the isolated atmosphere 207. Certain additive manufacturing systems can utilize a laminar flow of shielding gas between sheet and the build area.

In accordance with at least one aspect of this disclosure, a method can include locating an aperture in a sheet over an energy application spot (e.g., spot 405 as shown in FIG. 4) during an additive manufacturing process to allow spatter to eject through the aperture and land on a back side of the sheet. The method can include any other suitable method(s) and/or portion(s) thereof.

Embodiments can locate an aperture in a sheet relative to laser, for example. Spatter can fly through this aperture and land on back side of sheet instead of on the build area, preventing contamination. Embodiment can include a single strip with single aperture that can translate and roll all over the build area. Certain embodiments can have a larger strip/sheet that has multiple apertures that the laser can jump between.

FIG. 3 shows a sheet of paper 300 placed on top of a powder bed 301. FIG. 4 shows experimental results on the sheet of paper 300 confirming physics based statistical modeling that shows two plumes 403 of ejectant. As can be seen in FIG. 4, the particles closer are bigger, and it is frequently these types of particles that are the cause of defects. As can be seen, the plume blows downwind with the direction of the gas (top to bottom in the picture shown).

In accordance with this disclosure, spatter fields as a function of scan strategy can be largely predicted using probabilistic models. As such, it is possible to understand where the spatter fields will occur as a result from the sliced model code (e.g., Gcode) used to drive the additive manufacturing machine.

Embodiments include a shielding aperture that follows a laser path and acts to catch spatter ejected from the surface. The aperture can be defined by a perforation in a material that is controlled by two rollers and a linear actuator, for example. The material of the shielding aperture can be a thin sheet of material, e.g., so as not to disrupt the laminar gas flow over the powder bed.

Shielding the powder bed from ejected spatter can improve the quality of the build material. Material properties can become more predictable and occurrence of material defects can decrease. This can result in a higher yield of additive manufacturing parts. Embodiments also enable a more densely nested build plate without incurring issues due to spatter consolidation.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A spatter protection system for an additive manufacturing machine, comprising:
    a sheet configured to be disposed over a build area of the additive manufacturing machine, wherein the sheet includes an aperture configured to allow a spatter from the build area to eject through the aperture during energy application and to land on a back side of the sheet to prevent the spatter from landing on the build area;
    a motive system supporting the sheet and configured to move the sheet to locate the aperture over an energy application area, wherein the motive system includes a first roller and a second roller, wherein the sheet is rolled around each roller at an end thereof, wherein the first roller and second roller are configured to allow the aperture to be moved in a first axis.

2. The system of claim 1, wherein the motive system is configured to track an energy application spot such that an energy beam passes through the aperture without contacting the sheet.

3. The system of claim 1, wherein at least the first roller includes a motor configured to wind or unwind the sheet therefrom.

4. The system of claim 3, wherein the second roller is a slave configured to wind or unwind in response the first roller unwinding or winding, respectively.

5. The system of claim 4, the motive system includes a rod for each roller, wherein each roller is connected to a respective rod to be linearly actuated along the rod to move the aperture in a second axis perpendicular to the first axis.

6. The system of claim 5, further comprising one or more actuators connected to at least one rod, wherein the one or more actuators are configured to move each rod to linearly actuate a respective roller in the second axis.

7. The system of claim 6, further comprising a controller configured to control at least the first roller and the one or more actuators to locate the aperture over an energy application spot to allow spatter to eject through the aperture.

8. The system of claim 1, wherein the aperture is elliptical.

9. The system of claim 8, wherein the aperture is circular.

10. The system of claim 1, wherein the sheet is a fabric, a polymer, or a sheet metal.

11. The system of claim 10, wherein the sheet is Mylar, Teflon, stainless steel, aluminum, or tape.

12. The system of claim 11, wherein the sheet includes one or more additional apertures.

13. An additive manufacturing system, comprising:
    an energy applicator configured to apply energy to a build area;
    a build area; and
    a spatter protection system for an additive manufacturing machine, comprising:
        a sheet configured to be disposed over a build area of the additive manufacturing machine, wherein the sheet includes an aperture configured to allow a spatter from the build area to eject through the aperture during energy application and to land on a back side of the sheet to prevent the spatter from landing on the build area; and
        a motive system supporting the sheet and configured to move the sheet to locate the aperture over an energy application area, wherein the motive system includes a first roller and a second roller, wherein the sheet is rolled around each roller at an end thereof, wherein the first roller and second roller are configured to allow the aperture to be moved in a first axis.

14. The system of claim 13, further comprising a housing configured to enclose the build area to provide an isolated atmosphere, wherein the spatter protection system is disposed within the housing to be contained within an isolated atmosphere.

15. The system of claim 14, wherein the motive system is configured to track an energy application spot such that an energy beam passes through the aperture without contacting the sheet.

16. The system of claim 13, wherein at least the first roller includes a motor configured to wind or unwind the sheet therefrom.

17. The system of claim 16, wherein the second roller is a slave configured to wind or unwind in response the first roller unwinding or winding, respectively.

18. A method, comprising:
    locating an aperture in a sheet over an energy application spot during an additive manufacturing process to allow spatter to eject through the aperture and land on a back side of the sheet, wherein locating the aperture in the sheet includes, rolling the sheet around a first roller and a second roller and an end thereof, wherein the first roller and second roller are configured to allow the aperture to be moved in a first axis.

* * * * *